Sept. 19, 1967  H. B. HUNTER, JR  3,342,611

METHOD AND MEANS OF PACKAGING FOOD

Filed June 3, 1964

INVENTOR
HENRY B. HUNTER, JR.

BY Kimmel & Crowell
ATTORNEYS.

3,342,611
METHOD AND MEANS OF PACKAGING FOOD
Henry B. Hunter, Jr., Norfolk, Va., assignor to H. B. Hunter Company, Inc., Norfolk, Va.
Filed June 3, 1964, Ser. No. 372,255
4 Claims. (Cl. 99—154)

ABSTRACT OF THE DISCLOSURE

A device for maintaining a constant surplus of sugar syrup in the head space of a hermetically sealed food container which comprises a resilient polyethylene disc having a central aperture, a plurality of slots radiating outwardly from the aperture forming at their terminal ends a circular pattern, weakened portions in the disc interconnecting the terminal ends for forming hinges for tabs formed by the slots and an annular rim extending upwardly from the edge of the disc and a method for filling containers utilizing the device are disclosed.

---

This invention relates to improvements in the packaging of food and more particularly to a means for prolonging the shelf life of nut meats and fruits packed in a viscous liquid medium.

It is customary to package nut means and fruits, which are intended for consumption as dessert toppings, for example, in a viscous sugar syrup. Due to the partially dehydrated nature of nut meats, for example, there is a tendency for the nut meats to gradually absorb some of the sugar syrup. This tends to expose the surface of the uppermost nut meats to air and condensate which may be trapped beneath the receptacle closure during the hot-packing of the nut meats. Upon prolonged storage the nut meats thus exposed are subjected to deterioration through oxidation and the action of micro-organisms. This seriously affects consumer acceptance of the foods so packed.

Previous attempts to solve this problem have not been too successful.

The principal object of this invention is to provide an improved method and means of packaging foods in a viscous liquid medium.

Another object of this invention is to provide a food container having a head space which comprises a reservoir of syrup to insure total immersion of the foods packed therein.

Another object of this invention is to provide a method of packaging foods in a sugar syrup wherein a reservoir of syrup is maintained adjacent the head space of the container.

Still another object of this invention is to provide a syrup reservoir element for placement in the head space of a hermetically sealed container to insure total immersion of the foods packed in the container.

A further object of this invention is to provide a reservoir element which is inexpensive, non-absorbent, relatively inert and suitable for use with high speed food container filling equipment.

Other objects and features of the invention will become apparent from the description which follows which is to be taken as illustrative rather than limitative of the invention.

Figure 1:
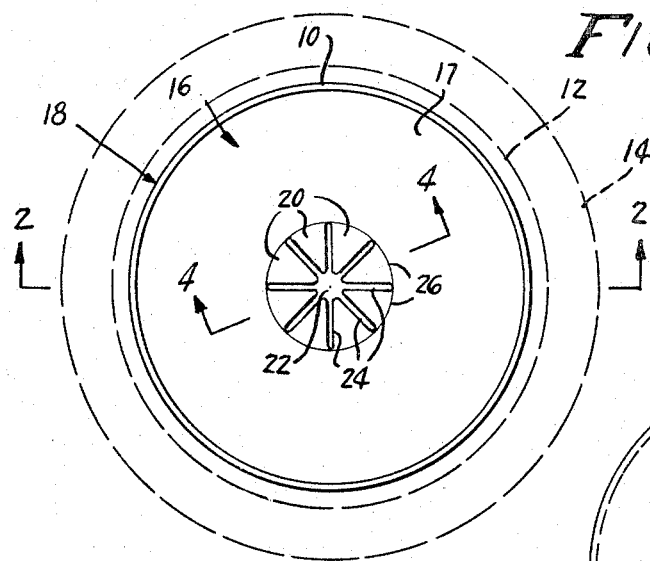
FIGURE 1 is a top plan view of the inventive device within the neck of a container.

Referring more specifically to the drawings wherein like reference numerals represent like parts, FIGURES 1, 2, 3, and 4 disclose a preferred embodiment of the invention, comprising, in general, a cup-shaped resilient reservoir element 10 which may be molded or stamped from suitable material such as food grade polyethylene, placed within, and of substantially the same or slightly smaller area than the inner diameter of, the neck 12 of the container 14. The container 14 has closure retaining means 15 to threadably engage a conventional closure cap, not shown.

Reservoir element 10 is characterized by a lower body portion 16 and an upstanding annular rim 18. A plurality of centrally disposed liquid metering elements 20 define a restricted flow aperture 22, and a plurality of radiating slots 24.

Figure 3:
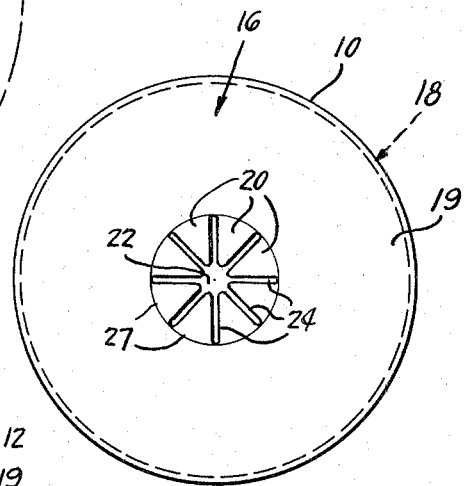
FIGURE 3 is a bottom plan view of the inventive device.
Figure 4:
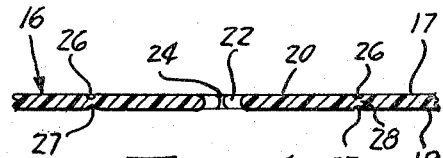
FIGURE 4 is a partial cross-sectional view of the lower body portion of the inventive device of FIGURE 1 taken on lines 4—4 in the direction of the arrows.

The metering elements 20 are integrally formed with the reservoir element 10 and cooperate to define a valve means which is normally in the position as shown in FIGURES 1, 3, and 4.

The metering elements 20 of the reservoir 10 are provided with a region 28 of reduced thickness which define an integral hinge by means of a groove 26 on the upper surface 17 of the lower body portion 16 and an opposed groove 27 on the lower surface 19 of the same.

The wedge-shaped metering elements 20 define a central aperture 22 with a plurality of slots 24 radiating therefrom and terminating at the integral hinge means 28. The wedge-shaped metering elements 20 thus cooperate to form a valve means, the function of which will be discussed later.

Figure 2:
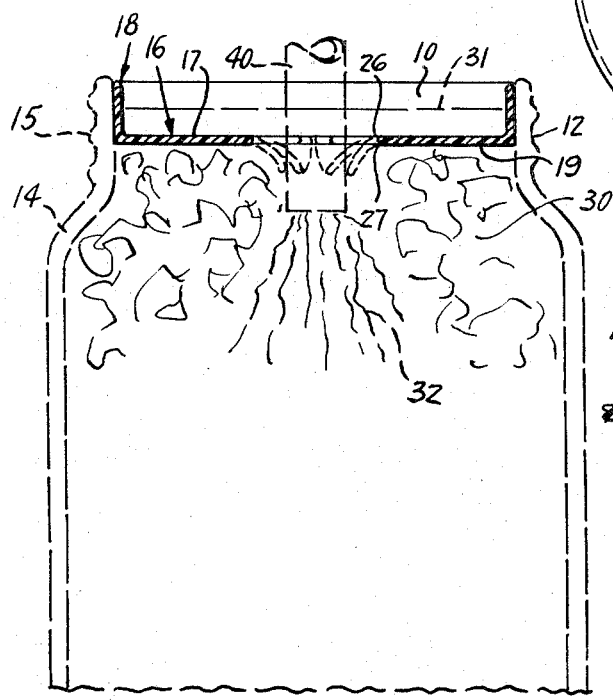
FIGURE 2 is a partial cross-sectional view of FIGURE 1 taken substantially on lines 2—2 in the direction of the arrows.

FIGURE 2 is illustrative of a method, in accordance with this invention, of packing nut meats, for example, utilizing the reservoir element 10. A suitable container 14 of glass or the like is partially filled with nut meats 30. The reservoir element 10 is then placed in the neck 12 of the container 14 with surface 19 resting on the nut meats 30 with the top of the upstanding annular rim 18 substantially in alignment with the top of the container neck 12. The container 14 is now ready to receive a sugar syrup to displace the air trapped in the interstices between the nut meats 30 and totally immerse them. Due to the viscous nature of the sugar syrup it would be time consuming and impractical to attempt to fill the container 14 with the sugar syrup 32 by introducing it above the reservoir element 10. Therefore, a conventional filler nozzle 40 is advanced downwardly through resilient elements 20 to the approximate position shown in FIGURE 2. Sufficient hot syrup is introduced to displace the air trapped in the interstices between the nut meats 30 and substantially fill the reservoir 10 to the approximate level 31, as shown in FIGURE 2.

During the introduction of the syrup the air displaced by the syrup is free to escape upwardly through the terminal ends of the slots 24. Some air also escapes between the outer surface of the upstanding rim 18 and inner surface of the container neck 12 due to the fact that the reservoir 10 is not in sealing engagement with the interior of the container neck 12.

The container 14 is then fitted with a suitable hermetic closure not shown. If a cold syrup is used the sealed container is given a suitable heat treatment to inhibit the growth of microorganisms, if desired.

The syrup 32 contained in the reservoir 10 is then available to be gradually metered downwardly through aperture 22 and slots 24 to replace the syrup absorbed by the nut meats. A surplus of syrup is of vital importance because nut meats and fruits absorb syrup slowly for a period of weeks after the containers are filled and sealed.

Therefore, the reservoir element 10 must be capable of initially retaining sufficient syrup so that at no time during storage of the sealed container does the level of the syrup recede enough to expose the foods packed therein to the air or condensate trapped in the head space of the container.

The dimensions of the aperture 22 and the slots 24 may be varied so long as they are sufficient to permit downward movement of the syrup contained in the reservoir 10 at a sufficient rate while preventing the upward passage of the nut meats 30 or other foods packed beneath the reservoir 10.

The packaging of nut meats or fruits in accordance with the method and means set forth greatly prolongs the shelf life of the product by maintaining optimum storage conditions.

While preferred forms of the invention have been set forth, it is to be understood that variations may be made, within the scope of the appended claims, without departing from the spirit of the invention.

I claim:
1. An article for maintaining a constant surplus of sugar syrup in the head space of a hermetically sealed food container which comprises a reservoir member, said reservoir member being formed of relatively inert material, said reservoir member having a substantially flat bottom portion and an annular upstanding rim portion, said bottom portion being of substantially the same cross section as the portion of said container defining said head space, said bottom portion having a liquid metering means therein permitting gradual downward flow of a portion of said sugar syrup, said annular upstanding rim portion being of substantially the same height as the head space in said food container, said liquid metering means comprising a plurality of centrally disposed metering members, said metering members defining a centrally disposed aperture and a plurality of slots radiating from said aperture, said aperture and said slots being dimensioned to feed sugar syrup from said reservoir member as the food absorbs the sugar syrup therebelow.

2. The article of claim 1 wherein said metering members are hingedly and resiliently carried by said bottom portion of said reservoir member to allow passage of a syrup feeding nozzle therethrough.

3. An article for maintaining a constant surplus of sugar syrup in the head space of a hermetically sealed food container which comprises:
    a polymeric plastic disc composed of resilient material, said disc having formed therein,
        a central aperture,
        a plurality of slots extending radially outwardly from the central aperture, said slots terminating in a circular pattern which is concentric with the central aperture, and
        weakened portions of the disc interconnecting the terminal ends of the slots to thereby form a plurality of inwardly oriented tabs, said weakened portions forming hinge portions for said tabs; and
    an annular rim extending upwardly from the edge of the disc, said rim being substantially the same height as the head space in the food container;
        whereby a nozzle may be inserted in said aperture by depressing the tabs for filling the container with syrup.

4. The method of prolonging the shelf life of nut meats in a container comprising the steps of:
providing a closable container;
substantially filling the closable container with nut meats leaving a head space above said nut meats in the containers;
covering the nut meats with a resilient disc member;
covering the nut meats and substantially filling the head space with sugar syrup by displacing a portion of the resilient disc with a nozzle and flowing the sugar syrup through the nozzle into the space below the resilient disc;
maintaining the resilient disc below the top of the container to hold the nut meats below the surface of the syrup in the head space; and
hermetically sealing the container to preserve the nuts and syrup.

References Cited
UNITED STATES PATENTS

| | | | |
|---|---|---|---|
| 1,948,353 | 2/1934 | Lagorio | 215—81 |
| 2,489,616 | 11/1949 | Buttery | 215—81 |

A. LOUIS MONACELL, *Primary Examiner.*

M. VOET, *Assistant Examiner.*